(12) United States Patent
Voll

(10) Patent No.: US 6,384,349 B1
(45) Date of Patent: May 7, 2002

(54) INVENTORY CONTROL APPARATUS

(75) Inventor: Rodger Francis Voll, Lacombe (CA)

(73) Assignee: Mr. Sajass Investments Inc., Lacombe (CA)

( * ) Notice: Subject to any disclaimer, the term of this patent is extended or adjusted under 35 U.S.C. 154(b) by 0 days.

(21) Appl. No.: 09/619,250

(22) Filed: Jul. 19, 2000

(30) Foreign Application Priority Data

Jul. 22, 1999 (CA) .............................................. 2278387

(51) Int. Cl.$^7$ ........................ G01G 19/40; G01G 19/08; G01G 19/14
(52) U.S. Cl. ...................... 177/25.19; 177/137; 702/174
(58) Field of Search ........................ 177/25.17, 25.13, 177/166, 136, 137, 134, 141, 146, 25.19; 702/174

(56) References Cited

U.S. PATENT DOCUMENTS

| | | | | |
|---|---|---|---|---|
| 4,137,977 A | * | 2/1979 | Alger | 177/146 |
| 4,616,723 A | * | 10/1986 | Pietzsch et al. | 177/136 |
| 4,832,141 A | * | 5/1989 | Perini et al. | 177/141 |
| 4,961,533 A | * | 10/1990 | Teller et al. | 177/25.17 |
| 5,199,517 A | * | 4/1993 | Kirby | 177/25.17 |
| 5,423,455 A | * | 6/1995 | Ricciardi et al. | 177/25.13 |
| 5,449,864 A | * | 9/1995 | Beatty et al. | 177/25.19 |
| 5,608,193 A | * | 3/1997 | Almogaibil | 177/25.13 |
| 5,814,771 A | | 9/1998 | Oakes et al. | 177/136 |
| 5,850,757 A | * | 12/1998 | Wierenga | 177/141 |
| 5,880,408 A | * | 3/1999 | Schreiner | 177/136 |
| 5,884,238 A | * | 3/1999 | Noll et al. | 702/174 |
| 5,917,159 A | * | 6/1999 | Kostiuk | 177/137 |
| 6,157,889 A | * | 12/2000 | Baker | 702/174 |
| 6,308,131 B1 | * | 10/2001 | Fox | 702/174 |

FOREIGN PATENT DOCUMENTS

| | | | | |
|---|---|---|---|---|
| GB | 2136141 A | | 3/1983 | G01G/18/10 |
| GB | 2155190 | * | 2/1985 | 177/25.17 |

OTHER PUBLICATIONS

Air–Weigh On–Board Scales, Eugene Oregon, product information, News Releases Jun. 9, 1999, May 12, 1998, Jan. 26, 1998, 17 pages.

Vulcan On–Board Scales, Kent Washington, Copyright 1997, product information, 15 pages.

Neway Anchorlok International, Copyright, 1998, product information, 7 pages.

* cited by examiner

Primary Examiner—Randy W. Gibson
(74) Attorney, Agent, or Firm—Christensen O'Connor Johnson Kindness PLLC

(57) ABSTRACT

An inventory control apparatus includes a support and a pressure sensitive device underlying the support, whereby a gross value is provided for the pressure exerted collectively by all inventory positioned on the support. A microprocessor is preprogrammed with an individual value that represents a single unit inventory unit. The microprocessor divides gross value as indicated by the pressure sensitive device by the individual value to determine the number of units of inventory remaining on the support.

3 Claims, 4 Drawing Sheets

INVENTORY CONTROL APPARATUS

FIELD OF THE INVENTION

The present invention relates to an inventory control apparatus.

BACKGROUND OF THE INVENTION

Whenever a product is stored, transported or consumed, here is a need to determine, with precision, the number of nits that remain. Once the number of units that remain is known, the number of units consumed is a mere matter of mathematical calculation derived by subtracting the number of units that remain from the number of units that one started with. A running inventory tally can be maintained as units are removed and replacement units added.

The units vary according to the nature of the product. Liquids are measured in gallons or litres. Grains are measured in bushels. Gravel is measured by the yard. Wire and lumber are measured in lineal feet. Products that are packaged are usually measured in terms of numbers of bags, boxes, or other form of packaging.

SUMMARY OF THE INVENTION

What is required is a versatile inventory control apparatus that is capable of being used with a wide variety of different products, without regard to the units by which the particular product is measured for the purposes of inventory control.

According to the present invention there is provided an inventory control apparatus which includes a support and a pressure sensitive device underlying the support, whereby a gross value is provided for the pressure exerted collectively by all inventory positioned on the support. A microprocessor is preprogrammed with an individual value that represents a single unit inventory unit. The microprocessor divides gross value as indicated by the pressure sensitive device by the individual value to determine the number of units of inventory remaining on the support as units are added or removed.

The inventory control apparatus, as described above, is more accurate and has fewer inherent disadvantages than most known inventory control systems. It is also extremely versatile and can be adapted to many applications, some of which will be hereinafter further described.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
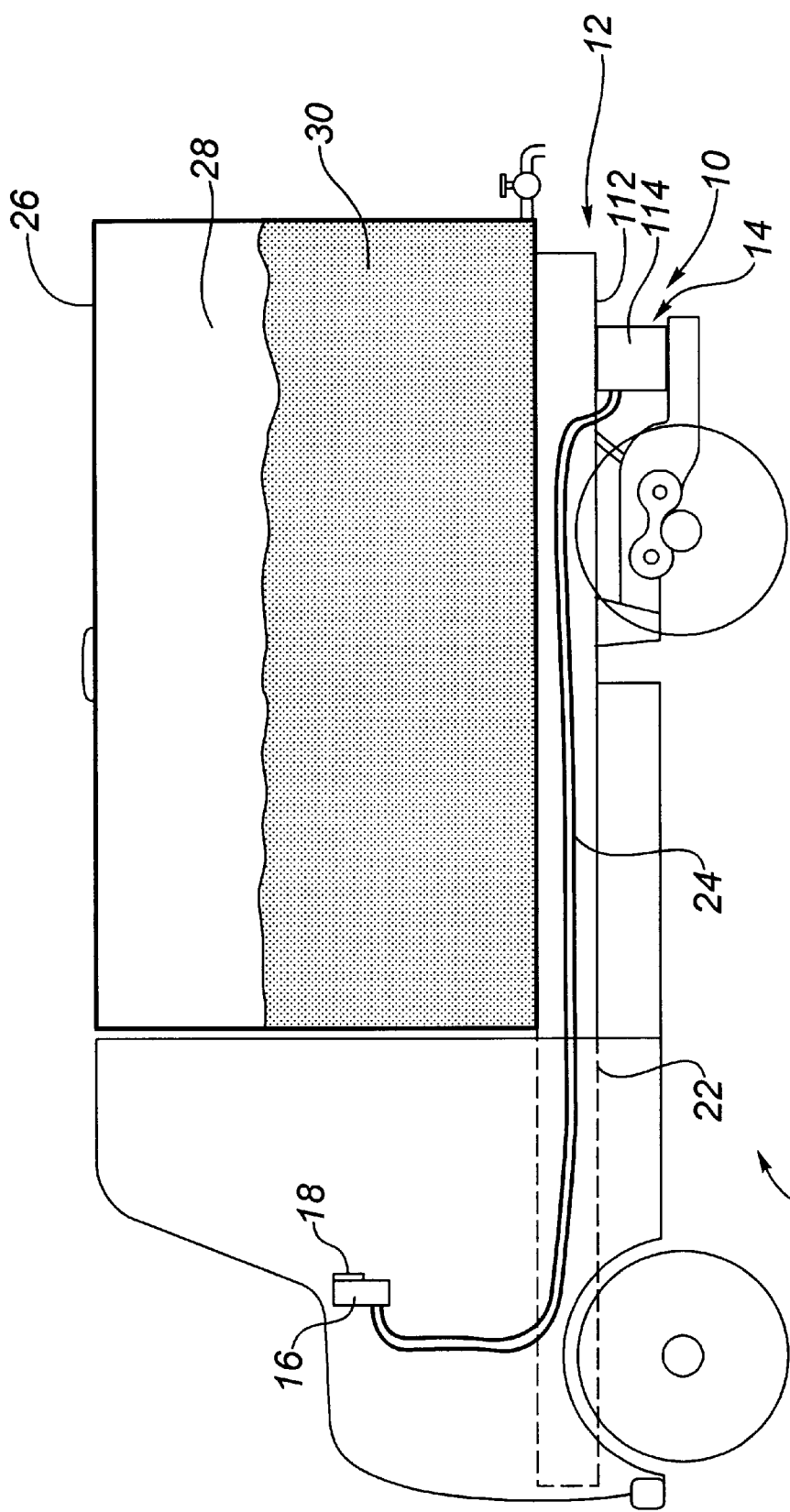
FIG. 1 is a side elevation view of a truck constructed in accordance with the teachings of the present invention.

There will now be described with reference to FIGS. 1 through 4, four inventory control apparatus, generally identified by reference numeral 10, developed for diverse applications in accordance with the teachings of the present invention.

Referring to FIGS. 1 through 4, inventory control apparatus 10 includes a load support 12, a pressure sensitive device 14, a microprocessor 16 and a display 18 for displaying the read out from microprocessor 16. The pressure exerted upon pressure sensitive device 14 by a load comprising load support 12 and a load of an inventory positioned thereon is converted to an electrical signal. The electrical signal corresponding to the gross value for pressure as indicated by pressure sensitive device 14 is transmitted by an electrical circuit 24 to microprocessor 16. Microprocessor 16 is preprogrammed with an individual value for pressure that represents a single inventory unit, and with an individual value representing a baseline value. Microprocessor 16 deducts the baseline value from the gross value for fluid pressure as indicated by pressure sensitive device 14, and then divides the remaining value by the individual value for fluid pressure to determine the number of units of inventory on load support 12. The number of units of inventory calculated by microprocessor 14 is displayed by display 18.

The application of inventory control apparatus 10 for measuring the load carried by a truck 20 will be described with reference to FIG. 1. Truck 20 has a chassis 22 having a load supporting portion 112 as load support 12. Pressure sensitive device 14 is an air suspension assembly 114 that underlies load supporting portion 112 of chassis 22. A baseline value for the fluid pressure exerted upon air suspension assembly 114 is determined when an interior cavity 28 of cargo container 26 is empty, and is programmed into microprocessor 14. When cargo container 26 has received cargo 30, the fluid pressure exerted upon air suspension assembly 114 increases. A gross value for the fluid pressure exerted upon air suspension assembly 114 by cargo container 26 and cargo 30 in interior cavity 28 is signalled by air suspension assembly 114 to microprocessor 16. Microprocessor 16 calculates the total amount of cargo 30 in cargo container 26 and the inventory is displayed by display 18. When a part of cargo 30 has been removed from cargo container 26, the gross value signalled from air suspension assembly 114 to microprocessor 16 changes, and microprocessor 16 calculates the inventory of cargo 30 remaining in cargo container 26 and the inventory that has been removed. One skilled in the art reviewing the example relating to truck 20, will appreciate that the teachings are equally applicable to trailer units. It will be appreciated that although air suspension is preferred due to the fact that many vehicles are already equipped with air suspension, a load cell could be used.

Microprocessor 16 is preprogrammed to perform the necessary calculations based upon the selection by the operator. If the cargo is grain, the operator indicates whether the grain is wheat, rye, barley, canola or some other grain and the conversion is performed in bushel units. If the cargo is a liquid, the operator indicates whether the liquid is oil, gasoline, milk, or some other liquid and the conversion is performed into gallons or litres. Thus microprocessor 16 is able to calculate inventory of different types of cargo 30 when an appropriate selection of preprogrammed data is selected by an operator.

Figure 2:
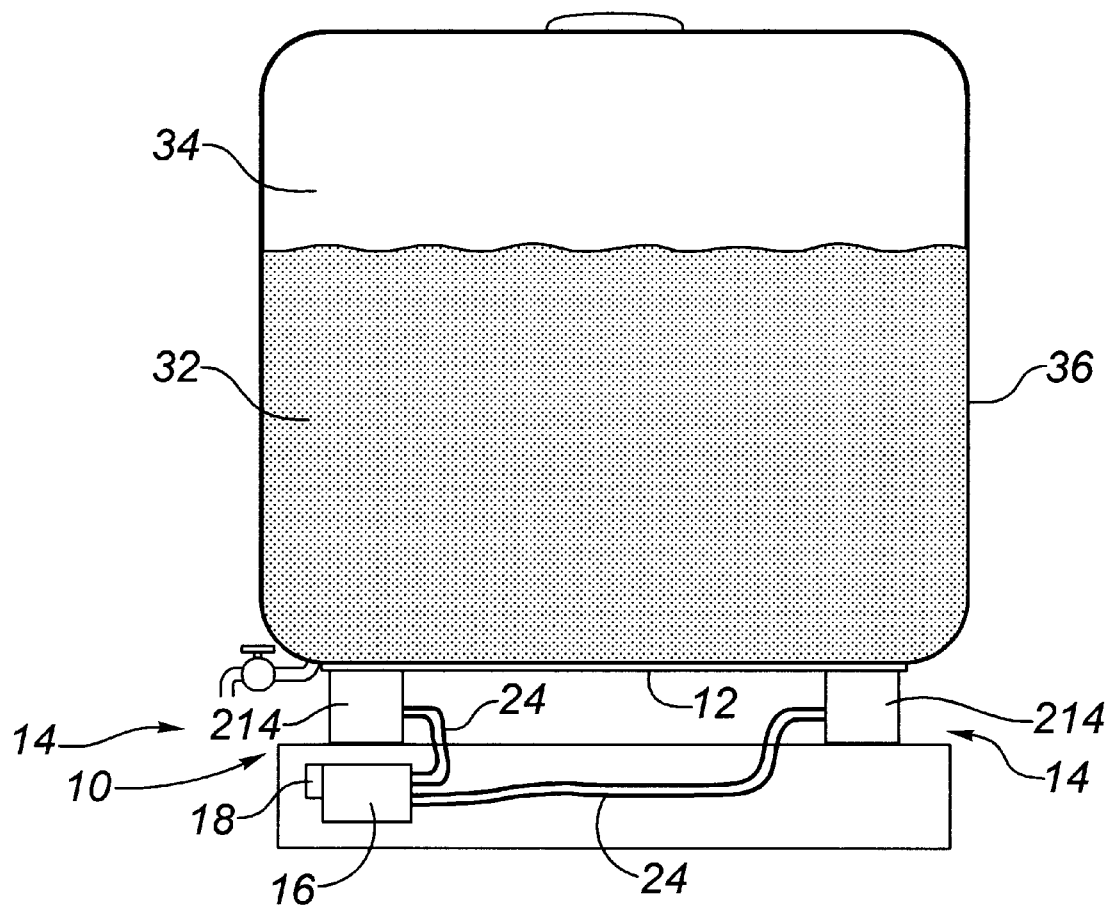
FIG. 2 is a front elevation view of a liquids storage tank constructed in accordance with the teachings of the present invention.

The application of inventory control apparatus 10 for measuring an amount of a grain or liquid 32 contained within an interior cavity 34 of a storage tank 36 will be described with reference to FIG. 2. Pressure sensitive device 14 is several load cells 214 underlying storage tank 36.

Microprocessor 16 is preprogrammed with a baseline value for a weight of storage tank 36 and with an individual weight for a single volumetric liquids inventory unit for each of several grains or liquids 32 that are to be stored in storage tank 36. A gross weight is provided for the pressure exerted collectively by all grains or liquids 32 positioned within storage tank 36. Microprocessor deducts the baseline value from the gross weight as indicated by the several load cells 214, and divides the remainder by the individual weight of a single volumetric inventory unit to determine the number of volumetric inventory units of grain or liquid 32 remaining in storage tank 36.

Figure 3:
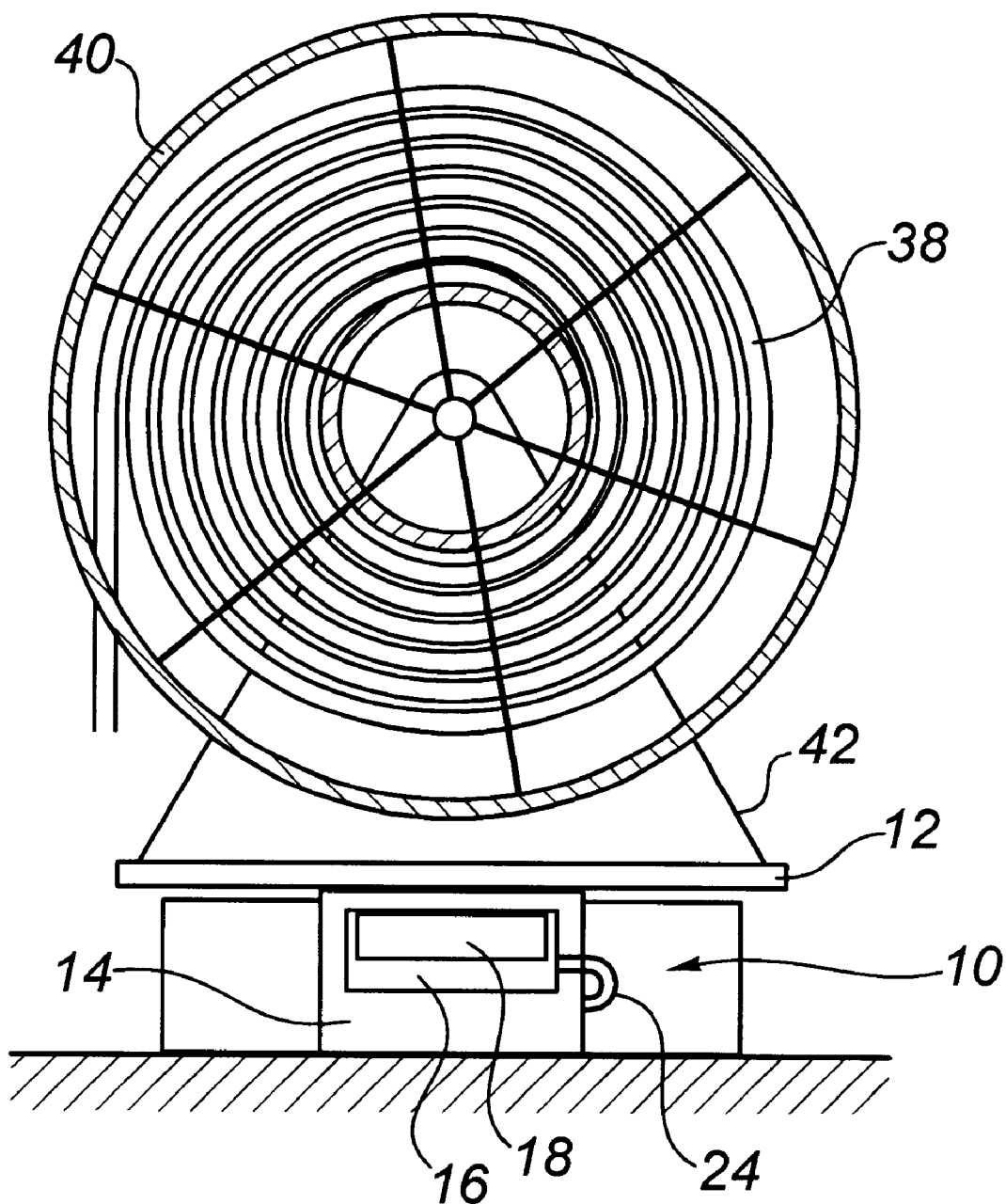
FIG. 3 is a front elevation view of a coiled tubing dispensing apparatus constructed in accordance with the teachings of the present invention.

The application of inventory control apparatus 10 for measuring a length of a flexible lineal material 38 contained on a reel 40 will be described with reference to FIG. 3. Pressure sensitive device 14 underlies a reel support 42 adapted to hold reel 40 containing length of flexible lineal material 38. Pressure sensitive device 14 signals a gross value for the pressure exerted collectively by support 42, reel 40 and all lineal material 38 positioned on reel 40 to microprocessor 16. Microprocessor 16 is preprogrammed with a baseline value for a weight of support 42 and reel 40, and an individual value that represents a single lineal unit of lineal material 38. Microprocessor deducts the baseline value from the gross value as indicated by the pressure sensitive device 14, and divides the remainder by the individual value to determine the number of units of lineal material 38 remaining on the reel 40.

Figure 4:
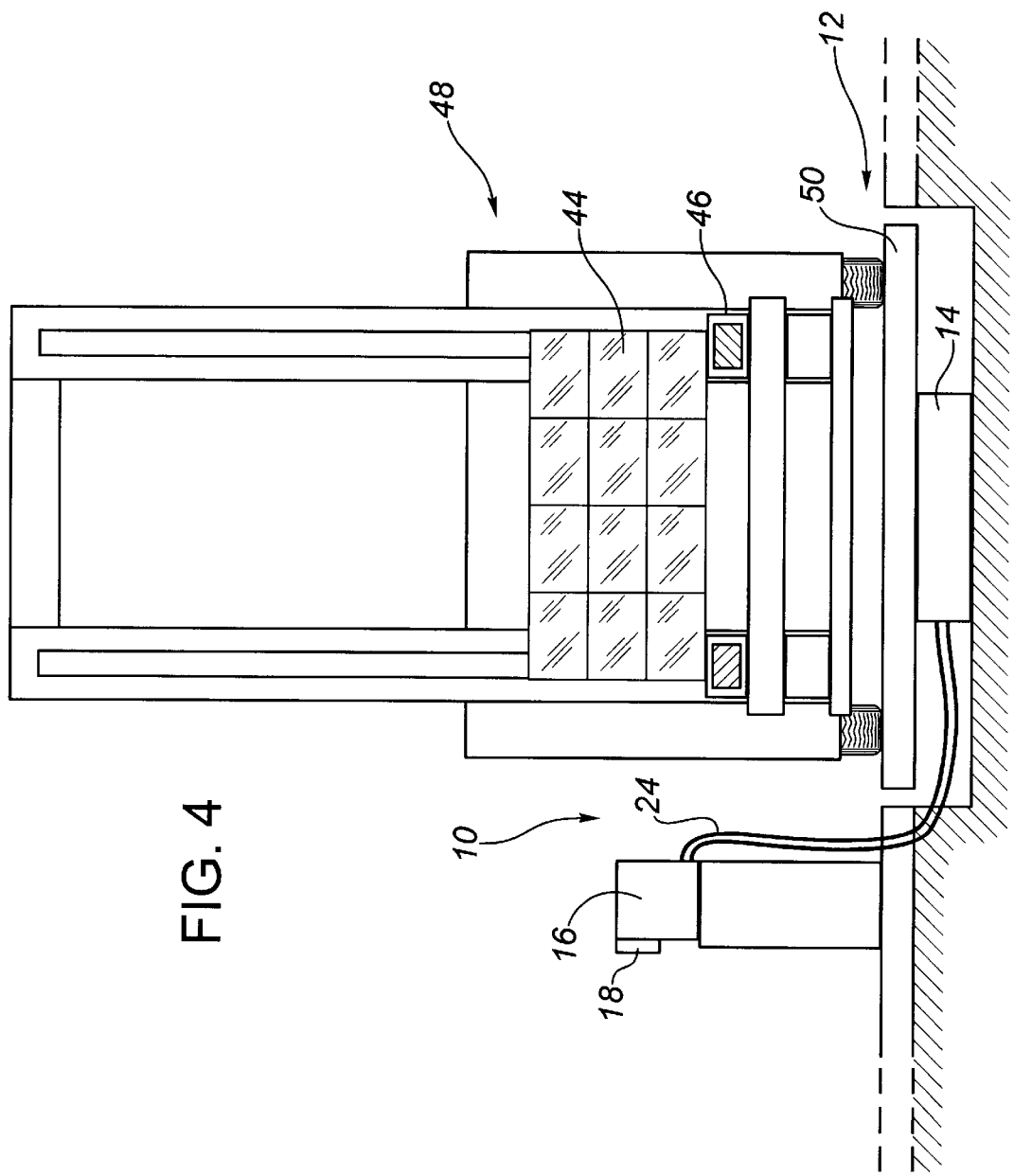
FIG. 4 is a side elevation view of a loading dock having a fork lift platform constructed in accordance with the teachings of the present invention.

The application of inventory control apparatus 10 for measuring the number of inventory units in a load 44 on a pallet 46 conveyed on a fork lift 48 will be described with reference to FIG. 4. Pressure sensitive device 14 underlies a fork lift positioning platform 50 that acts as load support 12. Pressure sensitive device 14 underlies fork lift positioning platform 50. Pressure sensitive device 14 provides a gross value for the pressure exerted collectively by fork lift 48 and fork lift positioning platform 50 together with all products 44 loaded on pallet 46 supported by fork lift 48.

Microprocessor 16 is preprogrammed with a value for fork lift 48, pallet 46, and an individual value that represents a single product. Microprocessor 16 deducts the values for fork lift 48 and pallet 46 from the gross value for the pressure read from pressure sensitive device 14, and divides the remaining value by the individual value to determine the number of products positioned on pallet 46.

Display 18 may face any one of several directions. When it is desired that the operator of fork lift 48 be able to read display 18 without dismounting from fork lift 48, display 18 faces fork lift 48. When it is desired that an inventory control person read display 18, display 18 will face in a direction away from fork lift 48, as illustrated in FIG. 4.

The inventory control apparatus, as described above, provides tremendous advantages in that it is able to handle a wide variety of product. It renders obsolete a wide variety of crude measurement techniques such as sight glasses and dip sticks. It replaces existing more specialized mechanisms. For example, liquids are presently measured using floats. These floats must be protected from corrosive exposure to the liquids they are measuring. In particular, the inventory control apparatus described is a much safer manner of inventory control. The operator is able to safely monitor loading and unloading of product without risk of accident. For example, there is no need to climb up onto a tank or truck and open a hatch as is required when a dip stick is used. There is always a risk in such cases of a fall. There is a risk with some products of being overcome due to exposure to fumes. There is no need to risk contamination of product or corrosion of measuring devices, as is the case with measuring devices that must be positioned in the product.

It is envisaged that the microprocessor would be capable of adding new products. This could be done by adding a single unit of the product in advance of loading so that the microprocessor could determine a value for a single unit. For example, all gravel is measured by the yard, and yet there are different sizes of stone. A yard of pea gravel does not necessarily have the same value as a yard of larger stones. It is also envisaged that the microprocessor would be capable of storing measurements in memory and recalling them upon command. This feature would be of assistance in isolating load weight from other factors. For example, with transport vehicles a portion of the total weight represents fuel, and then value will decline as fuel is consumed. Transport vehicles also encounter environmental factors, such as mud accumulations on the vehicle when travelling on rural roads.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An inventory control apparatus, comprising:
   a chassis of a vehicle having a load supporting portion;
   an air suspension assembly underlying the chassis whereby a gross value is provided for the fluid pressure exerted upon the air suspension assembly by inventory positioned on the load supporting portion of the chassis; and
   a microprocessor preprogrammed with an individual value for fluid pressure that represents a single inventory unit, the microprocessor dividing the gross value for fluid pressure as indicated by the air suspension assembly by the individual value for fluid pressure to determine the number of units of inventory remaining on the load supporting portion of the chassis.

2. The inventory control apparatus as defined in claim 1, wherein a tank is positioned on the load supporting portion of the chassis and the microprocessor is preprogrammed to convert a selected one of several alternative liquids into volumetric units.

3. The inventory control apparatus as defined in claim 1, wherein palleted products are positioned on the load supporting portion of the chassis and the microprocessor is preprogrammed to calculate the number of units after subtracting a known value for the pallets on which the products are positioned.

* * * * *